US009520584B2

(12) United States Patent
Kwak et al.

(10) Patent No.: US 9,520,584 B2
(45) Date of Patent: Dec. 13, 2016

(54) SECONDARY BATTERY

(75) Inventors: Eun-Ok Kwak, Yongin-si (KR); Jeong-Deok Byun, Yongin-si (KR); Jong-Wook Yoon, Yongin-si (KR); Byoung-Ju Kim, Yongin-si (KR); Kyung-Won Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 248 days.

(21) Appl. No.: 13/540,893

(22) Filed: Jul. 3, 2012

(65) Prior Publication Data

US 2013/0164585 A1    Jun. 27, 2013

(30) Foreign Application Priority Data

Dec. 21, 2011 (KR) .................. 10-2011-0139214

(51) Int. Cl.
| | |
|---|---|
| *H01M 2/20* | (2006.01) |
| *H01M 2/26* | (2006.01) |
| *H01M 2/30* | (2006.01) |
| *H01M 2/10* | (2006.01) |

(52) U.S. Cl.
CPC ............. *H01M 2/20* (2013.01); *H01M 2/202* (2013.01); *H01M 2/266* (2013.01); *H01M 2/30* (2013.01); *H01M 2/1077* (2013.01)

(58) Field of Classification Search
CPC .... H01M 10/04; H01M 10/0413; H01M 2/20; H01M 2/266; H01M 2/202; H01M 2/30; H01M 2/1077
USPC ................. 429/96, 161, 162, 163, 170, 178, 183, 429/158, 179
See application file for complete search history.

(56) References Cited

U.S. PATENT DOCUMENTS

| | | | |
|---|---|---|---|
| 6,242,128 B1 | 6/2001 | Tura et al. | |
| 7,179,562 B2 | 2/2007 | Zolotnik et al. | |
| 7,615,309 B2 | 11/2009 | Kim et al. | |
| 2007/0141457 A1* | 6/2007 | Amagai | H01M 2/021 429/152 |
| 2007/0292753 A1 | 12/2007 | Zama et al. | |
| 2008/0124617 A1* | 5/2008 | Bjork | 429/90 |
| 2008/0138698 A1* | 6/2008 | Ogami | H01M 2/1061 429/91 |

(Continued)

FOREIGN PATENT DOCUMENTS

| | | |
|---|---|---|
| JP | 2003-272573 | 9/2003 |
| JP | 2010-73336 | 4/2010 |

(Continued)

*Primary Examiner* — Nicholas P D'Aniello
*Assistant Examiner* — Philip A Stuckey
(74) *Attorney, Agent, or Firm* — Robert E. Bushnell, Esq.

(57) ABSTRACT

A secondary battery including: a battery unit including a battery cell and a lead tab that protrudes from the battery cell; a frame case for supporting the battery unit and including a first support portion for supporting the battery cell and a second support portion for supporting the lead tab; and a connection member for perforating a connection hole formed in the lead tab and extending in a direction of the second support unit, wherein the connection hole of the lead tab includes: a first connection hole that is spaced apart from a first edge of the lead tab by a first width; and a second connection hole that is spaced apart from a second edge of the lead tab by a second width. The secondary battery may reduce electrical resistance of a charge/discharge path and has improved efficiency.

15 Claims, 8 Drawing Sheets

(56) References Cited

U.S. PATENT DOCUMENTS

2013/0171486 A1* 7/2013 Joye et al. ............... 429/98

FOREIGN PATENT DOCUMENTS

| JP | 2010-97822 | | 4/2010 |
|---|---|---|---|
| WO | WO 2009038320 A1 | * | 3/2009 |
| WO | WO 2011134818 A1 | * | 11/2011 |

* cited by examiner

SECONDARY BATTERY

CLAIM PRIORITY

This application makes reference to, incorporates the same herein, and claims all benefits accruing under 35 U.S.C. §119 from an application earlier filed in the Korean Intellectual Property Office on 21 Dec. 2011 and there duly assigned Serial No. 10-2011-0139214.

BACKGROUND OF THE INVENTION

1. Field of the Invention

One or more embodiments of the present invention generally relate to a secondary battery.

2. Description of the Related Art

Secondary batteries are used in a variety of technical fields across a variety of industries due to their advantages. Such secondary batteries are widely used as energy sources of mobile electronic devices, such as digital cameras, cellular phones, or laptop computers, and are also used as energy sources of hybrid electric vehicles that are proposed as a solution to environmental contamination caused by gasoline and diesel internal combustion engines that use fossil fuel.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a secondary battery that may reduce electric resistance of a charge/discharge path and has improved efficiency.

Additional aspects will be set forth in part in the description which follows and, in part, will be apparent from the description, or may be learned by practice of the presented embodiments.

According to one or more embodiments of the present invention, a secondary battery may include: a battery unit including a battery cell and a lead tab that protrudes from the battery cell; a frame case for supporting the battery unit and including a first support portion for supporting the battery cell and a second support portion for supporting the lead tab; and a connection member for perforating a connection hole formed in the lead tab and extending in a direction of the second support unit, wherein the connection hole of the lead tab may include: a first connection hole that is spaced apart from a first edge of the lead tab by a first width; and a second connection hole that is spaced apart from a second edge of the lead tab by a second width.

A ratio of the first width with respect to an overall width of the lead tab may be designed to be 12.5% or more.

A ratio of the second width with respect to an overall width of the lead tab may be designed to be 12.5% or more.

The secondary battery may further include a terminal member that is interposed between the second support portion and the lead tab.

The terminal member may be integrated with the second support portion.

A fixing protrusion and a fixing hole that are used in combining the second support portion and the terminal member may be formed in the second support portion and the terminal member, respectively.

The lead tab and the terminal member may overlay each other, and the connection member may be used in combining the lead tab and the terminal member.

One side of the lead tab may contact the terminal member, and a holder case may be disposed on the other side of the lead tab.

The connection member may perforate the holder case and the lead tab continuously and may be connected to the terminal member.

According to one or more embodiments of the present invention, a secondary battery may include: a battery unit including a battery cell and a lead tab that protrudes from the battery cell; a frame case for supporting the battery unit and including a first support portion for supporting the battery cell and a second support portion for supporting the lead tab; a terminal member that is interposed between the lead tab and the second support portion and is fixed on the second support portion; and a connection member that perforates a connection hole formed in the lead tab and is connected to the terminal member.

The connection hole of the lead tab may include: a first connection hole that is spaced apart from a first edge of the lead tab by a first width; and a second connection hole that is spaced apart from a second edge of the lead tab by a second width.

A ratio of the first width with respect to an overall width of the lead tab may be designed to be 12.5% or more.

A ratio of the second width with respect to an overall width of the lead tab may be designed to be 12.5% or more.

A ratio of the first width with respect to an overall width of the lead tab and a ratio of the second width with respect to an overall width of the lead tab may be designed to be 33.33% or less, respectively.

A first width w1 and a thickness t of the lead tab may satisfy the equation $w1 \times t \geq 3$ mm$^2$.

The first width w1 and a height h of the lead tab may satisfy the equation $w1 \times h \geq 310$ mm$^2$.

The terminal member may be integrated with the second support portion.

A fixing protrusion and a fixing hole that are used in combining the second support portion and the terminal member may be formed in the second support portion and the terminal member, respectively.

The terminal member may include a first side that faces the second support portion and a second side that extends in a different direction from a direction of the first side.

A connection hole through which a bus bar for electrical connection with an adjacent secondary battery is connected to the terminal member, may be formed in the second side of the terminal member.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
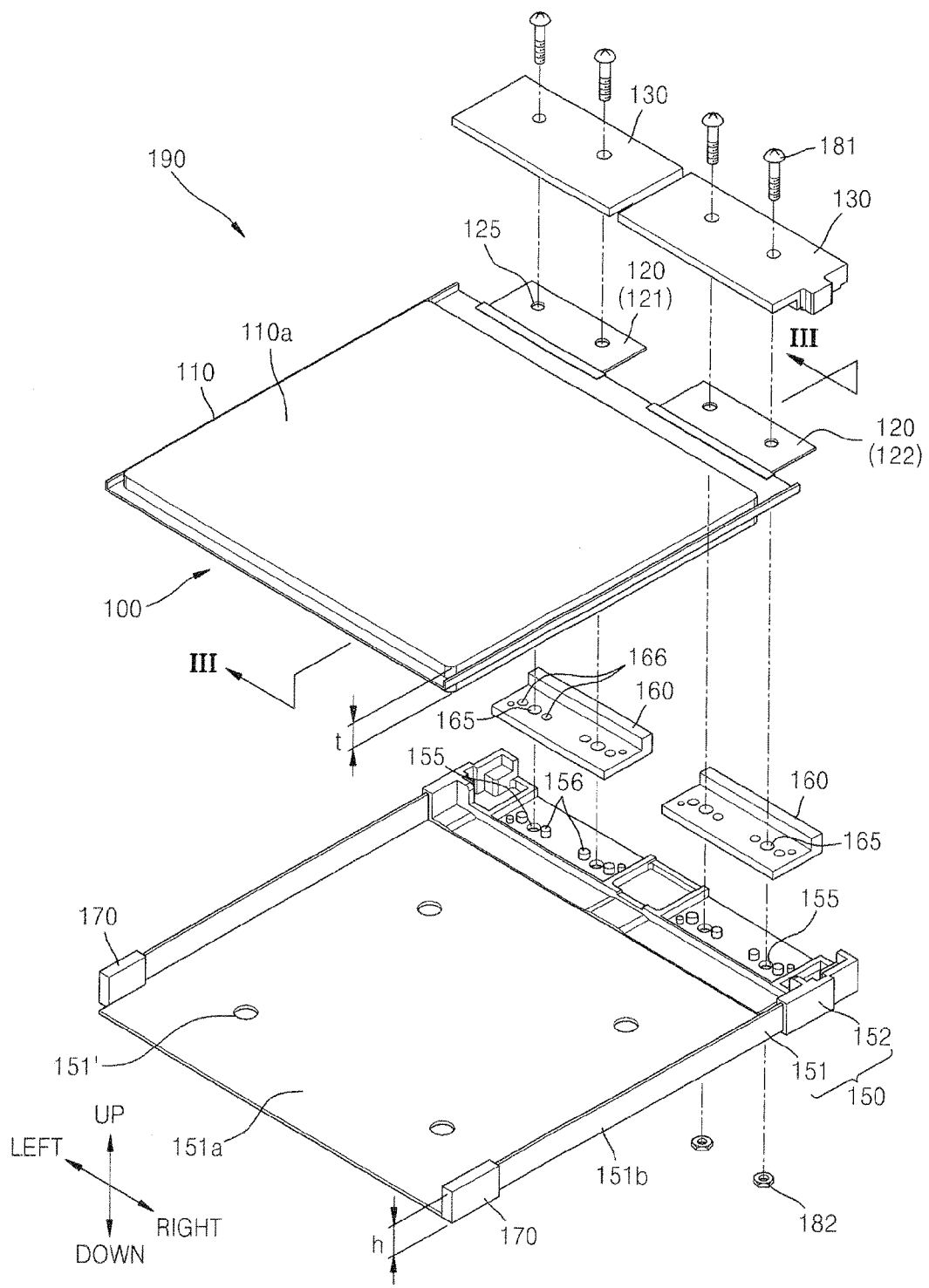
FIGS. 1 and 2 are exploded perspective views of a secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
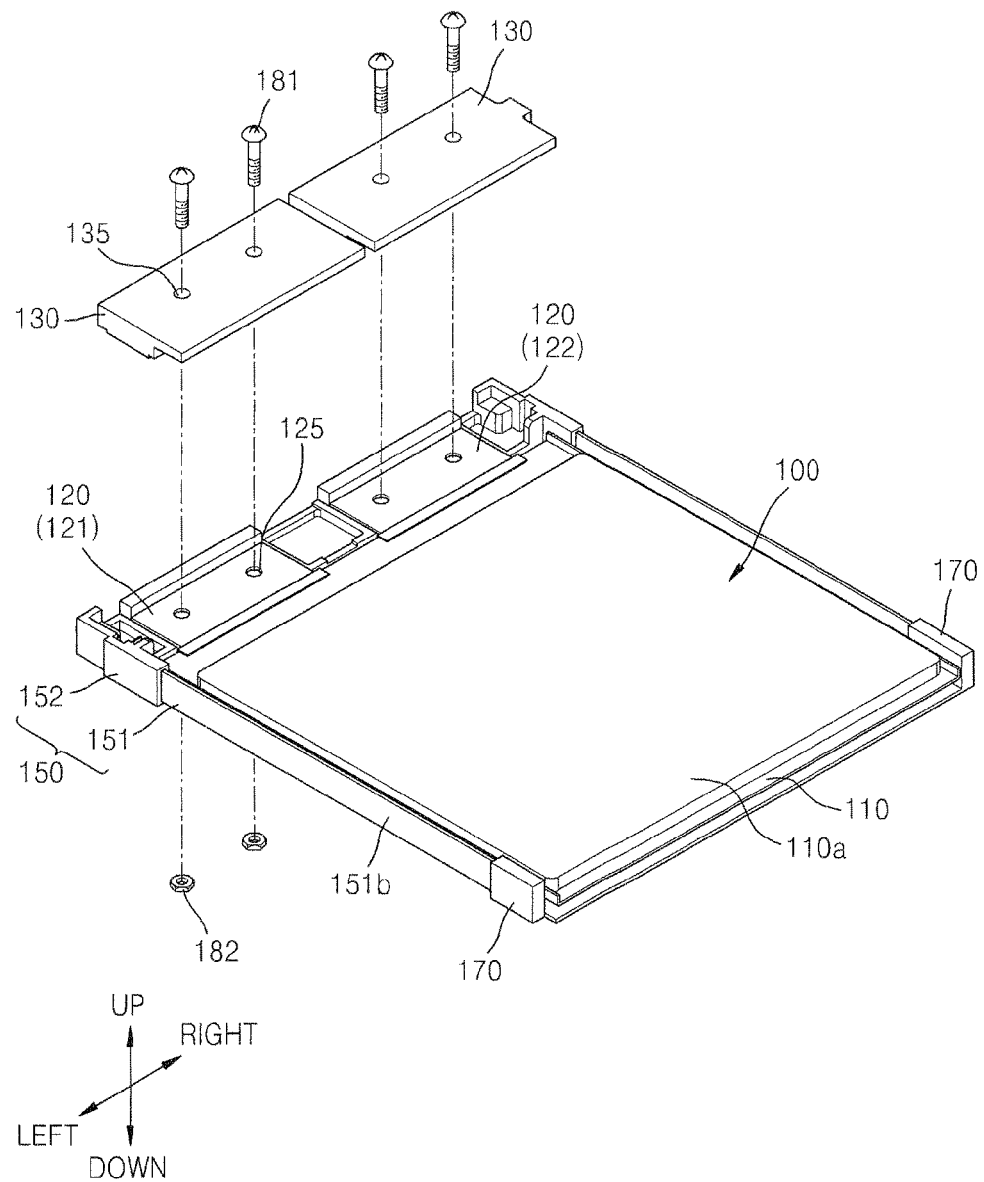
Figure 3:
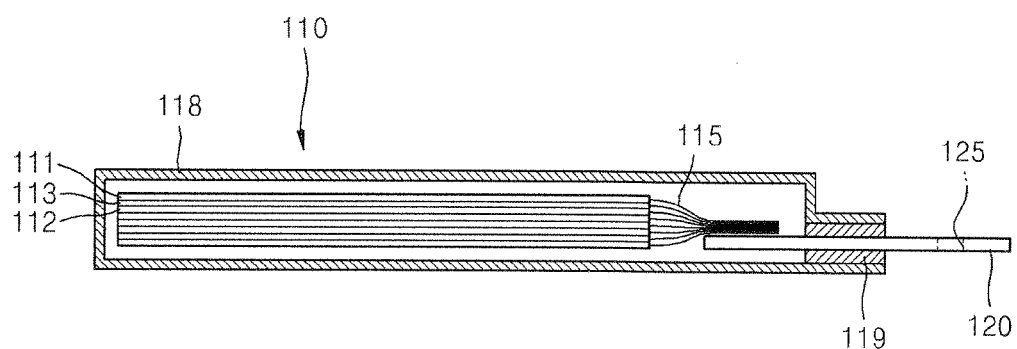
FIG. 3 is a cross-sectional view taken along a line of FIG. 1.

FIGS. 1 and 2 are exploded perspective views of a secondary battery 190 according to an embodiment of the present invention, and FIG. 3 is a cross-sectional view taken along a line of FIG. 1.

Referring to FIGS. 1, 2, and 3, the secondary battery 190 may include a battery unit 100 and a frame case 150 that accommodates the battery unit 100.

The battery unit 100 may include a lithium-ion battery, for example. The battery unit 100 includes a battery cell 110 and a lead tab 120 that is electrically connected to the battery cell 110 and protrudes from the battery cell 110.

Referring to FIG. 3, the battery cell 110 may include an electrode assembly in which an anode plate 111, a separator 113, and a cathode plate 112 overlay one another sequentially, for example. In this regard, a plurality of anode plates 111, a separator 113, and a cathode plate 112 may be stacked on the electrode assembly so as to provide the battery cell 110 with high-output and high-capacity. By interposing the separator 113 between the anode plate 111 and the cathode plate 112, the electrode assembly in which the anode plate 111 and the cathode plate 112 are alternately stacked, is sealed in a pouch 118.

Although not shown, the anode plate 111 may be formed by coating the surface of an anode collector with an anode activation material, and the cathode plate 112 may be formed by coating the surface of a cathode collector with a cathode activation material.

Electrode tabs 115 may be electrically connected to the anode plate 111 and the cathode plate 112, respectively. The electrode tabs 115 that protrudes from the anode plate 111 and the cathode plate 112, which are stacked with respect to each other, may overlay one another. The electrode tabs 115 that may be close to each other are electrically connected to the lead tab 120. For example, the electrode tabs 115 and the lead tab 120 may be connected to each other using ultrasonic fusion.

The lead tab 120 constitutes an external interconnection of the battery cell 110 and protrudes from the battery cell 110 so as to induce an electric current to the outside from the battery cell 110. For example, a portion of the lead tab 120 protrudes from the pouch 118, and an insulation member 119 may be interposed between the lead tab 120 and the pouch 118 so as to obtain an insulation property.

Referring to FIG. 1, the lead tab 120 may be formed of metal having high conductivity, such as nickel, aluminum, copper, or the like. For example, the lead tab 120 may include first and second lead tabs 121 and 122 having different polarities. The first and second lead tabs 121 and 122 may be electrically connected to the anode plate 111 and the cathode plate 112 of the battery cell 110, respectively.

The battery cell 110 may be electrically connected to an external load or an external power supply unit via the lead tab 120. That is, a charge-discharge current of the battery cell 110 is withdrawn from the external load or may be input from the external power supply unit via the lead tab 120.

Since the charge-discharge current is collected on the lead tab 120, electrical resistance may be reduced thus improving charging/discharging efficiency. Thus, the lead tab 120 may be formed of metal having low electrical resistance, such as nickel, aluminum, copper, or the like.

A connection hole 125, through which the lead tab 120 may be electrically connected to a terminal member 160, may be formed in the lead tab 120. The connection hole 125 may be formed spaced apart from an edge of the lead tab 120 by a predetermined distance. A pair of connection holes 125 may be formed spaced apart from both edges of the lead tab 120 by a predetermined distance.

The battery unit 100 may be combined with the frame case 150 and may be supported by the frame case 150. The battery cell 100 and the frame case 150 are combined with each other to face each other.

The frame case 150 includes a first support portion 151 that accommodates and supports the battery cell 110, and a second support portion 152 that accommodates the lead tab 120 that protrudes from the battery cell 110 and supports the lead tab 120.

The frame case 150 may serve as a heat-dissipating plate that dissipates operation heat generated when performing a charging and discharging operation of the battery unit 100, to the outside, along with a function of protecting the battery unit 100 from external shock. To this end, the first support portion 151 may be formed of metal having mechanical rigidity and high thermal conductivity, such as aluminum, or the like.

The first support portion 151 may have a flat plate shape, and ribs 151b having a bent shape may be formed at both edges of the first support portion 151 so as to surround the battery cell 110. That is, the first support portion 151 may include a plate-shaped main body portion 151a and the ribs 151b that constitute wings at both sides of the main body portion 151a, and the ribs 151b may be bent from the main body portion 151a and may be formed as one body with the main body portion 151a. For example, the main body portion 151a of the first support portion 151 may support main sides of the battery cell 110, i.e., a lower side of upper and lower sides of the battery cell 110 in the drawing, and the ribs 151b may extend from the first support portion 151 in a lateral direction so as to cover sides of the battery cell 110. The first support portion 151 surrounds the battery cell 110, thereby protecting the battery cell 110 having relatively low rigidity and being insulated from an external environment. For example, the first support portion 151 of the frame case 150 may be formed of metal having high electrical conductivity, such as aluminum, and may be insulated from the external environment by performing a surface treatment, such as anodizing.

Spacers 170 may be formed on the ribs 151b. The spacers 170 may be formed as one body with the frame case 150 when the frame case 150 may be formed using injection molding. The spacers 170 may be formed of an insulating resin, for example, a polymer resin material, such as polyphenylene sulfide (PPS), or the like, and may be formed as an injection molding formation formed of a polymer resin material. The spacers 170 may be formed with the first support portion 151 of the frame case 150, and for example, the frame case 150 having a composite shape of the first support portion 151 formed of metal and the spacers 170 formed of resin may be obtained using injection molding of different materials.

The spacers 170 may be used in forming a predetermined space between secondary batteries 190 that are adjacent to each other in a direction in which the secondary batteries 190 are stacked in a battery module (not shown) in which a plurality of secondary batteries 190 are electrically connected to each other. For example, a height h of the spacer 170 may be greater than a thickness t of the battery cell 110.

In more detail, the battery cell 110 that may be supported on the frame case 150 may be used as one unit, and the battery cells 110 may be stacked parallel to each other and may be electrically connected in series or in parallel, thereby forming a battery module with high-output and high-capacity. In this regard, a predetermined space between the plurality of battery cells 110 stacked with respect to each other may be formed by the spacer 170 that surrounds the battery cells 110, and the battery cells 110 that are adjacent to each other in a direction in which the battery cells 110 are stacked, may be stacked by interposing the space therebetween. The space may allow swelling of the battery cell 110 that may occur during the charging and discharging operation. Heat generated in the battery cell 110 is discharged through the space so that heat dissipation of the battery cell 110 may be promoted.

A bent hole 151' for heat dissipation may be formed in the first support portion 151. Operation heat generated by performing the charging and discharging operation of the battery cell 110 may be dissipated using low-temperature air that is made to flow through the bent hole 151'.

The first support portion 151 is open to the outside. Thus, an upper side 110a that is one of main sides of the battery cell 110 accommodated in the first support portion 151 may be exposed to the outside, and operation heat generated in the battery cell 110 may be dissipated to the outside. That is, the main body portion 151a of the first support portion 151 supports the battery cell 110 on a lower side that is one of main sides of the battery cell 110, and the ribs 151b of the first support portion 151 cover sides of the battery cell 110 to protect them, and the upper side 110a of the battery cell 110 may be exposed to the outside.

The second support portion 152 accommodates the lead tab 120 that protrudes from the battery cell 110. The second support portion 152 accommodates the lead tab 120 by interposing the terminal member 160 between the second support portion 152 and the lead tab 120. For example, a connection member 181 may perforate the lead tab 120 and may be combined with the terminal member 160 so that the lead tab 120 and the terminal member 160 may be combined with each other. To this end, a spiral groove (not shown) to be combined with the connection member 181 may be formed in a connection hole 165 of the terminal member 160.

A connection hole 155 through which the connection member 181 perforates the lead tab 120, may be formed in the second support portion 152. The connection hole 155 may be formed in positions corresponding to the connection hole 125 of the lead tab 120 and the connection hole 165 of the terminal member 160.

The second support portion 152 may insulate the terminal member 160 from the external environment and may be formed of an insulating material, for example, a polymer resin material, such as PPS, or the like, so as to prevent an electrical short, or may be formed as an injection molding formation formed of a polymer resin material. The second support portion 152 may be formed as one body with the first support portion 151 by performing injection molding of different materials. By performing injection molding of different materials, the frame case 150 in which the first support portion 151 formed of metal and the second support portion 152 formed of resin are formed as one body, may be obtained.

The terminal member 160 may be fixed on the second support portion 152. By fixing the terminal member 160 on the second support portion 152, the terminal member 160 may be combined with the second support portion 152. For example, the terminal member 160 may be integrated with the second support portion 152 when the second support portion 152 is formed. More specifically, the second support portion 152 may be formed using injection molding, and when the second support portion 152 is formed by injection molding, the terminal member 160 may be disposed in an injection molding frame (not shown), and a raw material paste (not shown) may be injected into the injection molding frame (not shown) so that the raw material paste may be hardened and the second support portion 152 that is integrated with the terminal member 160 may be obtained.

A fixing hole 166, through which the terminal member 160 may be combined with the second support portion 152, may be formed in the terminal member 160. For example, a fixing protrusion 156 that protrudes from the second support portion 152 may be inserted in the fixing hole 166 of the terminal member 160 so that the terminal member 160 and the second support portion 152 may be integrated with each other. The fixing protrusion 156 may be formed by injecting the raw material paste into the fixing hole 166 of the terminal member 160 when the second support portion 152 is formed using injection molding.

The fixing hole 166 formed in the terminal member 160 may be adjacent to the connection hole 165, and one or a plurality of fixing holes 166 may be formed if needed. For example, a pair of fixing holes 166 may be formed in both sides of each connection hole 165, as illustrated in FIG. 1. The fixing protrusion 156 may be formed on the second support portion 152 in a position corresponding to the fixing hole 166. A pair of fixing protrusions 156 may be formed on both sides of the connection hole 155.

The terminal member 160 may be electrically connected to the lead tab 120 and relays a charge-discharge current to an inside and an outside of the frame case 150. For example, the charge-discharge current generated in the battery cell 110 may flow through the lead tab 120 and may be withdrawn from the secondary battery 190 via the terminal member 160 that is electrically connected to the lead tab 120.

A surface of the terminal member 160 may be in contact with a surface of the lead tab 120 by being folded with the lead tab 120, and the connection member 181 may perforate the connection hole 125 of the lead tab 120 and the connection hole 165 of the terminal member 160, and the lead tab 120 and the terminal member 160 may be closely adhered to each other by the connection member 181 that may be combined with the connection hole 165 of the terminal member 160.

In this regard, the connection member 181 perforates the lead tab 120 and may be combined with the terminal member 160 so that the lead tab 120 and the terminal member 160 may be combined with each other.

The terminal member 160 may be formed of metal having high conductivity, such as nickel, copper, aluminum, or the like, and may have an approximately rectangular metal block shape. For example, the terminal member 160 may have a nickel-plated copper block shape.

The connection hole 165 through which the terminal member 160 may be combined with the lead tab 120, may be formed in the terminal member 160. The connection hole 165 of the terminal member 160 may be formed in a position corresponding to the connection hole 125 of the lead tab 120. The terminal member 160 and the lead tab 120 may be combined with each other, for example, by disposing the terminal member 160 and the lead tab 120 to overlay each other, by inserting the connection member 181 in the connection holes 125 and 165 formed in the terminal member 160 and the lead tab 120, respectively, and by combining the connection member 181 with the connection hole 165 of the terminal member 160.

A combination of the terminal member 160 and the lead tab 120 may be performed simultaneously with a combination of the frame case 150 and the battery unit 100. That is, the frame case 150 and the battery unit 100 may face each other so that the first support portion 151 and the battery cell 110 face each other and the second support portion 152 and the lead tab 120 face each other.

The second support portion 152 may face the lead tab 120 by interposing the terminal member 160 between the second support portion 152 and the lead tab 120. For example, the terminal member 160 and the lead tab 120 may face each other in a state where the terminal member 160 has been already fixed on the second support portion 152. The connection member 181 may be combined with the terminal member 160 so that the terminal member 160 and the lead tab 120 are combined with each other. In this regard, the connection member 181 perforates the lead tab 120 and may be combined with the terminal member 160 so that the battery unit 100 and the frame case 150 may be combined with each other simultaneously.

In other words, by combining the terminal member 160 and the lead tab 120, the frame case 150 on which the terminal member 160 may be fixed and the battery unit 100 on which the lead tab 120 may be fixed, may be combined with each other simultaneously. However, aspects of the present invention are not limited thereto. For example, an additional combination structure for combining the frame case 150 and the battery unit 100 may also be provided.

The connection member 181 may have a connection structure in which the connection member 181 may perforate the connection holes 125 and 165 formed in the lead tab 120 and the terminal member 160, respectively, and may be inserted in the connection holes 125 and 165, and a bolt structure for a screw combination may be used. The connection member 181 may be screw-combined with the spiral groove (not shown) formed in the connection hole 165 of the terminal member 160. However, as illustrated in FIG. 1, the combination member 182 may be disposed on the same axis as that of the connection member 181, and the connection member 181 and the combination member 182 may be formed in a bolt-nut structure.

In a medium-large size battery with large capacity and high output, a thickness of a connection portion including the terminal member 160 and the lead tab 120 may be increased. Thus, a mechanical connection using the connection member 181 may be more advantageous than a connection method using hot fusion. In the connection method using hot fusion, a high-output heat source is necessary, lack of connection strength and non-uniform distribution may occur, and a fuseable thickness is limited. Thus, it is sufficient that the connection member 181 is used in connecting the lead tab 120 and the terminal member 160 using the mechanical connection, and the connection member 181 may not be limited to a bolt or screw structure.

Referring to FIG. 1, one side of the lead tab 120, for example, a bottom side of the lead tab 120 may be in contact with the terminal member 160. As pressure is applied to the connection member 181 during connection between the lead tab 120 and the terminal member 160, the lead tab 120 may be forced against the terminal member 160, and the lead tab 120 and the terminal member 160 closely contact each other. In this regard, the other side of the lead tab 120, for example, a top surface of the lead tab 120 may be padded with a holder case 130.

The holder case 130 may serve to not expose electrical connection members, such as the lead tab 120, the terminal member 160, and the like, and to insulate the electrical connection members from the external environment so as to prevent electrical interference caused by the external environment.

Figure 4:
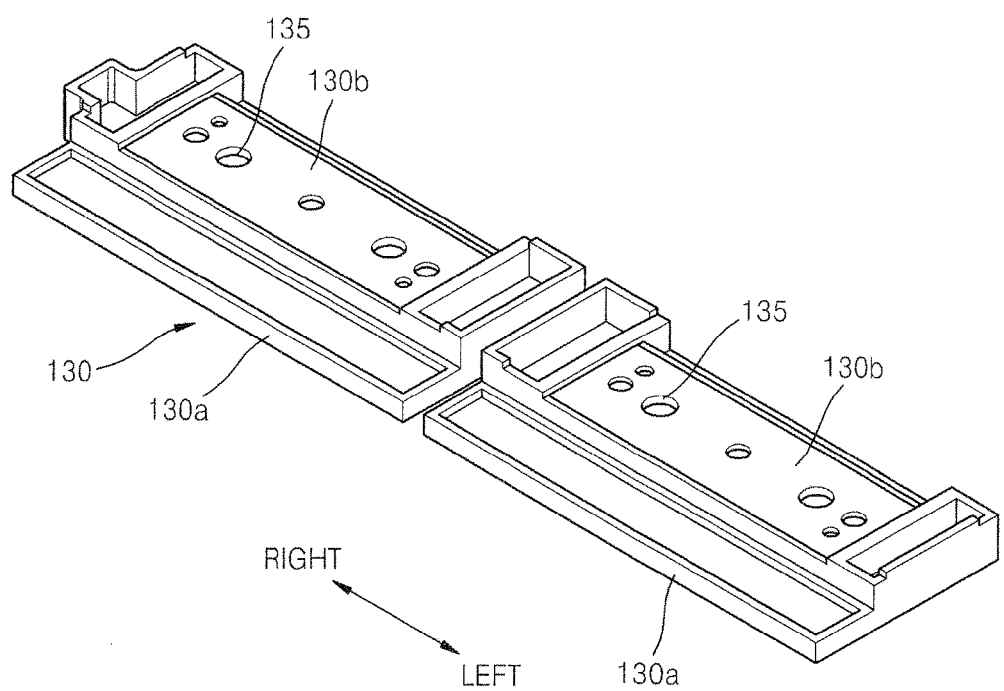
FIG. 4 is a perspective view of a structure of a connection hole of the secondary battery illustrated in FIG. 1 in more detail.

FIG. 4 illustrates the holder case 130 in more detail, that is, is a perspective view of a bottom side of the holder case 130. Referring to FIG. 4, an outer portion of the holder case 130 may be formed of an insulating material. That is, a cover member 130a that constitutes the outer portion of the holder case 130 may be formed of an insulating resin material.

The holder case 130 may serve to reduce electrical resistance of a connection portion by reinforcing an electrical connection state of the connection portion formed by the terminal member 160 and the lead tab 120 and furthermore to improve charging/discharging efficiency. For example, the holder case 130 may apply uniform surface pressure that allows the lead tab 120 to be forced against the terminal member 160. Thus, a connection force between the lead tab 120 and the terminal member 160 may be improved. For example, the lead tab 120 may be pressed in a sandwich shape between the terminal member 160 and the holder case 130 and may be securely electrically connected to the terminal member 160 and the holder case 130.

The holder case 130 may provide an additional electrical connection region to reduce electrical resistance of a charging and discharging current. To this end, an inner portion of the holder case 130 that faces the lead tab 120 may be a conductive plate 130b. The conductive plate 130b may be formed of metal having high electrical conductivity. A pair of holder cases 130 may be disposed at both sides of first and second lead tabs 121 and 122 to be combined with the first and second lead tabs 121 and 122.

The holder case 130 may have a flat plate shape and may include a connection hole 135 for perforation of the connection member 181. The connection hole 135 of the holder case 130 may be formed in a position corresponding to the connection hole 125 of the lead tab 120. The connection member 181 that connects the terminal member 160 and the lead tab 120 may perforate the holder case 130 and may be inserted in the holder case 130. The terminal member 160, the lead tab 120, and the holder case 130 may be connected to one another by using the same connection member 181. That is, the same connection member 181 may perforate the holder case 130 and the lead tab 120 to be combined with the terminal member 160 so that a process of manufacturing the secondary battery 190 may be simplified.

Figure 5:
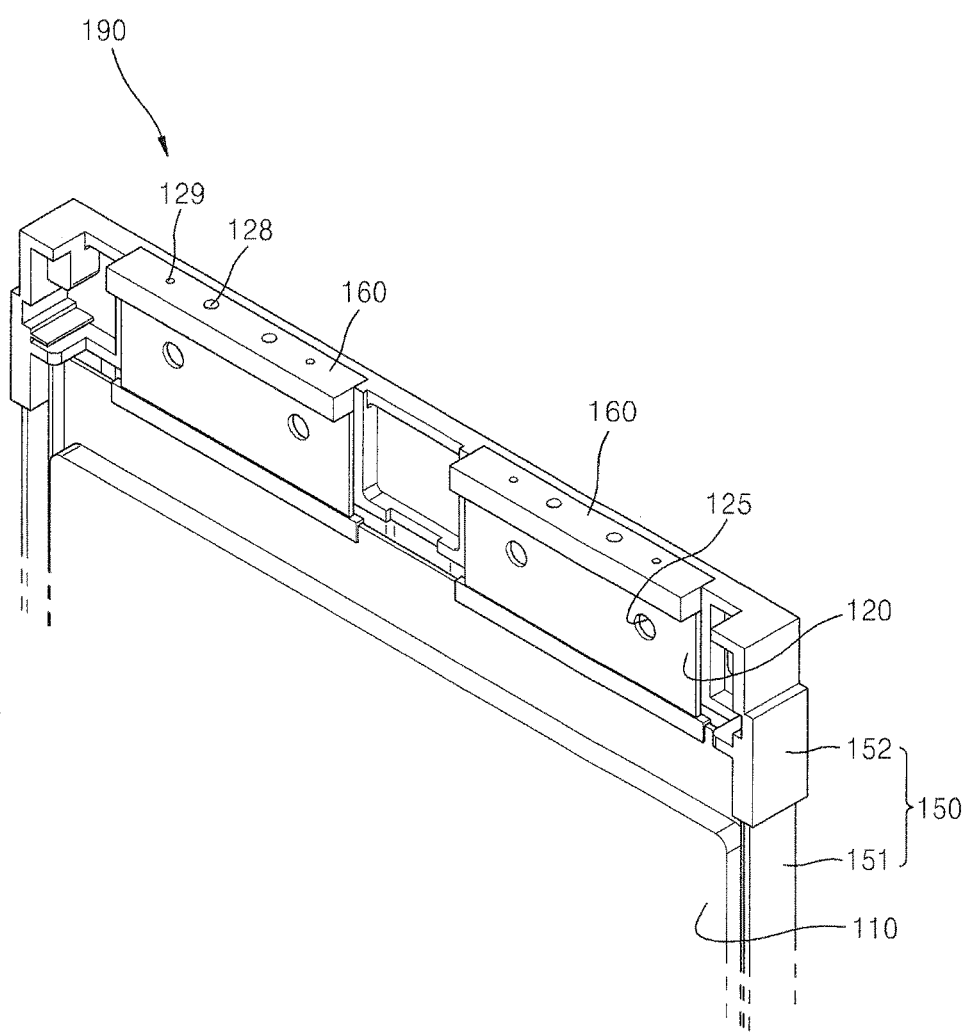
FIG. 5 is a perspective view of the secondary battery of FIG. 1 that is viewed vertically.

FIG. 5 is a perspective view of the secondary battery 190 of FIG. 1 that is viewed vertically. However, illustration of the holder case 130 is omitted. Referring to FIG. 5, the terminal member 160 may be combined with the second support portion 152 of the frame case 150. For example, the terminal member 160 may be combined with the second support portion 152 so that one side (top side in the drawing) of the terminal member 160 may be exposed.

A bus bar (not shown) having a structure in which a plurality of secondary batteries 190 are electrically connected to each other to constitute a medium-large size battery with large capacity and high output, may be disposed on the exposed top side of the terminal member 160. A connection hole 128 of the bus bar (not shown) may be formed in the top side of the terminal member 160. A through hole 129 for forming a path for transmitting signals or supplying power to a controller (not shown) for controlling a charging and discharging operation of the secondary batteries 190 or an external device (not shown), may be formed in the top side of the terminal member 160.

The terminal member 160 has a block shape. In detail, the terminal member 160 may have a block shape including a first side facing the second support portion 152 and a second side (that corresponds to the top side of the terminal member 160) extending in a different direction from a direction of the first side. The connection hole 128 for the bus bar (not shown) or the through hole 129 for forming a path for transmitting signals or supplying power may be formed in the second side of the terminal member 160.

Figure 6:
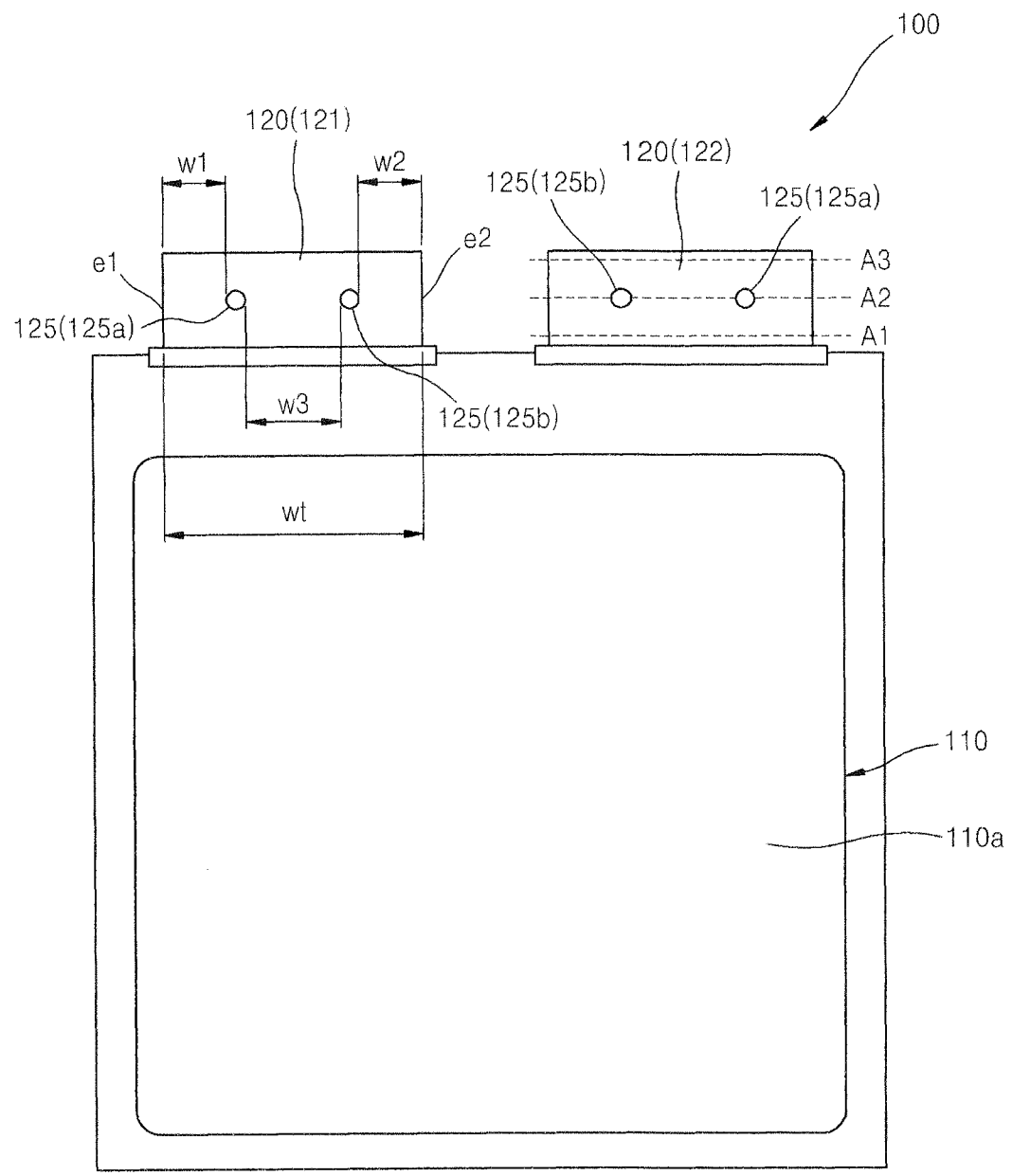
FIG. 6 illustrates a lead tab illustrated in FIG. 1 in more detail.

FIG. 6 illustrates the lead tab 120 illustrated in FIG. 1 in more detail. Referring to FIG. 6, the connection hole 125 may be formed in the lead tab 120 that protrudes from the battery cell 110, and the lead tab 120 and the terminal member 160 are integrated with each other through the connection hole 125.

Since the connection hole 125 may be formed in a position symmetrical to the first and second lead tabs 121 and 122, the first lead tab 121 will be described below. However, technical matters regarding the connection hole 125 that will be described below may be applied to both the first and second lead tabs 121 and 122 or may be applied to only one of the first and second lead tabs 121 and 122.

The lead tab 120 may constitute a path of the charge-discharge current of the battery cell 110, and the charge-discharge current generated in the battery cell 110 flows through the lead tab 120 and is withdrawn from the terminal member 160 that may be electrically connected to the lead tab 120. Thus, in order to reduce electrical resistance of a charge/discharge path, the lead tab 120 and the terminal member 160 may be tightly in contact with each other. For example, if a portion of a region where the lead tab 120 and the terminal member 160 face each other comes off, the charge-discharge current may be collected in another contact region, and resistance heat may be accumulated due to collected current, and a continuous increase in electrical resistance may occur, and as such, charging/discharging efficiency may be decreased.

Referring to FIG. 6, the connection hole 125 may include a first connection hole 125a that may be spaced apart from a first edge e1 of the lead tab 120 by a first width w1, and a second connection hole 125b that may be spaced apart from a second edge e2 of the lead tab 120 by a second width w2.

A pair of connection holes 125 are formed in both sides of the lead tab 120 in this way so that pressure generated by the connection member 181 may be comparatively uniformly applied to the lead tab 120. Thus, the lead tab 120 may be closely adhered to the terminal member 160 under generally uniform surface pressure. If a single connection hole 125 is formed in the lead tab 120, connection pressure of the connection member 181 applied through the central connection hole 125 may not be uniformly applied to the entire side of the lead tab 120, and in particular, an edge of the lead tab 120 may not be closely adhered to the terminal member 190, and the lead tab 120 may come off the terminal member 160. This causes an increase in electrical resistance of the connection portion formed by the lead tab 120 and the terminal member 160.

Positions where the first and second connection holes 125a and 125b are formed, may be represented by the first width w1 and the second width w2 that are spaced apart from the first and second edges e1 and e2 of the lead tab 120, respectively. The first width w1 and the second width w2 provide a design variable for a position where the connection hole 125 may be formed.

A ratio of the first width w1 with respect to the overall width wt of the lead tab 120 may be designed to be 12.5% or more. In other words, a relative ratio of the first width w1 with respect to the overall width wt of the lead tab 120 may be designed to be 1:8 or less.

For example, when the overall width wt of the lead tab 120 is 80 mm, the first width wt may be 10 mm or more. For example, when the first width w1 is 15.75 mm, a ratio of the first width w1 with respect to the overall width wt of the lead tab 120 may be approximately 19.69%, and a relative ratio of the first width w1 with respect to the overall width wt of the lead tab 120 may be approximately 1:5.08.

Likewise, a ratio of the second width w2 with respect to the overall width wt of the lead tab 120 may be designed to be 12.5% or more. In other words, a relative ratio of the second width w2 with respect to the overall width wt of the lead tab 120 may be designed to be 1:8 or less.

For example, when the overall width wt of the lead tab 120 is 80 mm, the second width w2 may be 10 mm or more. For example, when the second width w2 is 15.75 mm, a ratio of the second width w2 with respect to the overall width wt of the lead tab 120 may be approximately 19.69%, and a relative ratio of the second width w2 with respect to the overall width wt of the lead tab 120 may be approximately 1:5.08.

This is because, when the connection hole 125 is formed slanted toward the first and second edges e1 and e2, connection pressure of the connection member 181 may be non-uniform at the first through third widths w1, w2, and w3, for example, the lead tab 120 comes off from its central portion so that electrical resistance between the lead tab 120 and the terminal member 160 may be increased.

For example, when the relative ratio of the first width w1 or the second width w2 with respect to the overall width wt of the lead tab 120, which are spaced apart from the first and second edges e1 and e2 of the lead tab 120, respectively, is designed to be less than 12.5%, the connection hole 125 may be formed slanted toward the first and second edges e1 and e2 of the lead tab 120, and as a force for connecting the lead tab 120 and the terminal member 160 is concentrated on the first and second edges e1 and e2 of the lead tab 120, the central portion of the lead tab 120 may not be closely adhered to the terminal member 160 and may come off from the terminal member 160.

When the central portion of the lead tab 120 comes off from the terminal member 160, the lead tab 120 is not closely adhered to the terminal member 160, and electrical resistance between the lead tab 120 and the terminal member 160 may be increased, and charging/discharging efficiency may be decreased.

In consideration of this, as a design variable for a position where the connection hole 125 is formed, a ratio of the first width w1 or the second width w2 that may be spaced apart from the first edge e1 or the second edge e2 of the lead tab 120, with respect to the overall width wt of the lead tab 120 may be designed to be 12.5% or more.

In other words, a position where the first connection hole 125a is formed, may be represented by a relative ratio of the first width wt that is spaced apart from the first edge e1 of the lead tab 120 with respect to the overall width wt of the lead tab 120, and a relative ratio of the first width w1 with respect to the overall width wt of the lead tab 120 may be designed to be 1:8 or less.

Likewise, a position where the second connection hole 125b is formed, may be represented by a relative ratio of the second width w2 that is spaced apart from the second edge e2 of the lead tab 120 with respect to the overall width wt of the lead tab 120, and a relative ratio of the second width w2 with respect to the overall width wt of the lead tab 120 may be designed to be 1:8 or less.

As described above, design specifications for the position where the connection hole 125 is formed, are provided not to be slanted toward the first and second edges e1 and e2 of the lead tab 120 so that the central portion of the lead tab 120 may be closely adhered to the terminal member 160 and the lead tab 120 and the terminal member 160 may be closely adhered to each other under uniform surface pressure.

In another aspect, the lead tab 120 constitutes a path of the charge-discharge current, and a discharge current withdrawn from the battery cell 110 and a charge current input to the battery cell 110 flow through the lead tab 120. Thus, the charge-discharge current may be collected on the lead tab 120.

The charge-discharge current flows through the lead tab 120 at the first through third widths w1, w2, and w3 based on the connection hole 125. For example, the charge-discharge current that flows through a first cross-sectional area A1 of the lead tab 120 may constitute a flow that may be diverted into the first through third widths w1, w2, and w3 from a second cross-sectional area A2 of the lead tab 120 and may be flown out through a third cross-sectional area A3 of the lead tab 120. In this regard, by forming the first and second connection holes 125a and 125b, a current density may be increased at the second cross-sectional area A2, and concentrative heat dissipation may occur in the second cross-sectional area A2.

If the first and second connection holes 125a and 125b are formed slanted toward the first and second edges e1 and e2 of the lead tab 120, the first width w1 and the second width w2 in the range from the first and second edges e1 and e2 of the lead tab 120 to the first and second connection holes 125a and 125b are limited to be narrow. Thus, a current density at the first width w1 and the second width w2 may be increased, and concentrative heat dissipation may occur in the first width w1 and the second width w2. The first width w1 and/or the second width w2 may be continuously hot fused so that a thermal fuse phenomenon may occur.

Thus, the positions where the first and second connection holes 125a and 125b are formed, may not be slanted toward the first and second edges e1 and e2 of the lead tab 120. As described above, a ratio of the first width w1 with respect to the overall width wt of the lead tab 120 may be designed to be 12.5% or more, and likewise, a ratio of the second width w2 with respect to the overall width wt of the lead tab 120 may be designed to be 12.5% or more.

Figure 7A:
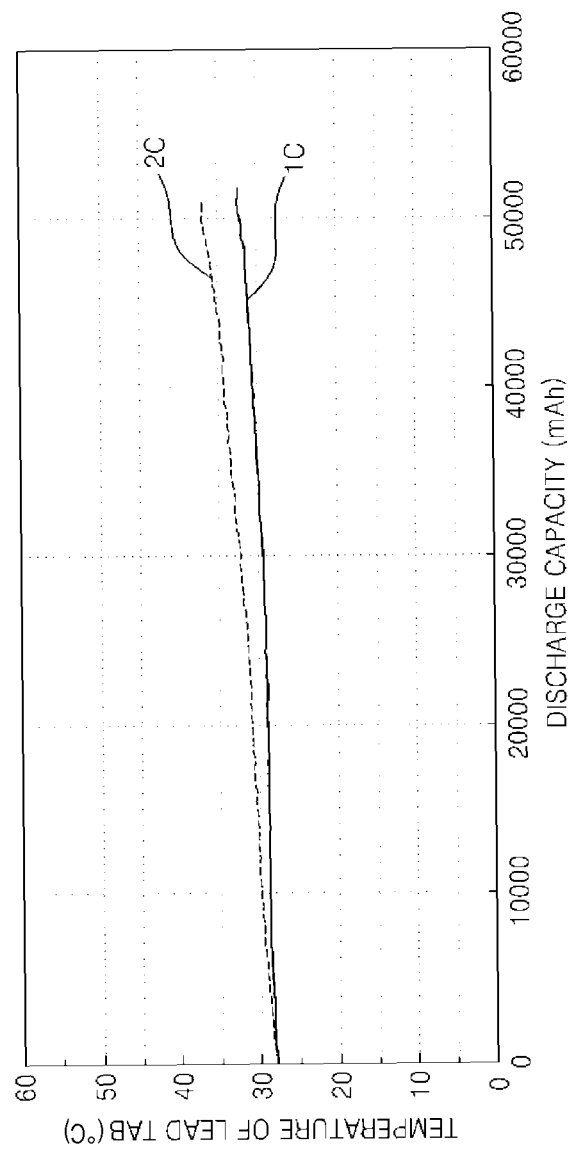
FIGS. 7A and 7B are graphs showing a heat dissipation state of a lead tab according to a comparative example and a heat dissipation state of a lead tab according to an embodiment of the present invention, respectively.
Figure 7B:
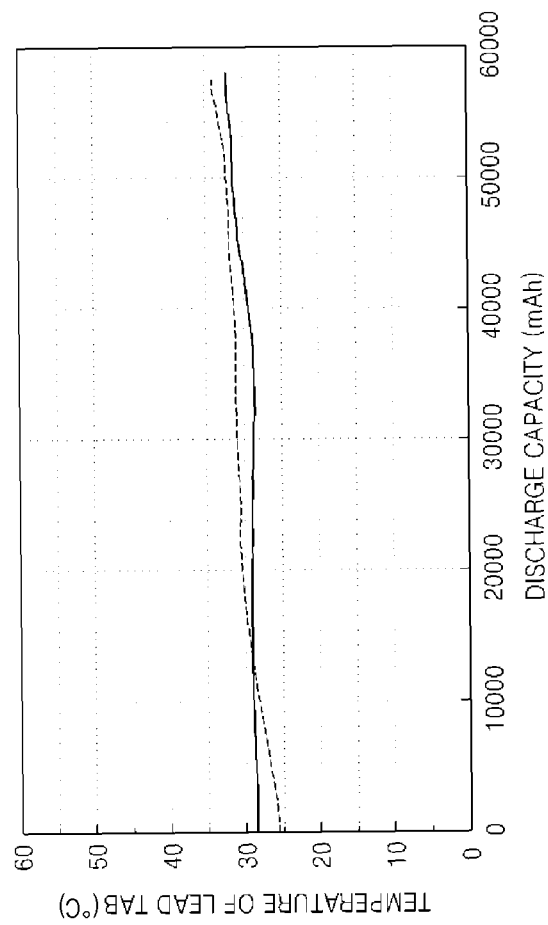

FIGS. 7A and 7B are graphs showing a heat dissipation state of a lead tab according to a comparative example and a heat dissipation state of the lead tab 120 according to an embodiment of the present invention, respectively. Hereinafter, for convenience of explanation, results of measuring heat dissipation according to an embodiment of the present invention and according to a comparative example, respectively, will be described by referring to reference numerals shown in FIG. 6.

In the comparative example and the present invention, a position where the connection hole 125 may be formed in the lead tab 120 according to the comparative example, and a position where the connection hole 125 may be formed in the lead tab 120 according to the present invention, are different from each other, and the other structures thereof are the same, and the overall width wt of the lead tab 120 is the same, 80 mm.

In the comparative example, the first width w1 and the second width w2 at which the connection hole 125 may be spaced apart from both edges e1 and e2 of the lead tab 120, are designed to be 8 mm. Considering that the overall width wt of the lead tab 120 is 80 mm, a ratio of the first width w1 and the second width w2 at which the connection hole 125 may be spaced apart from both edges e1 and e2 of the lead tab 120, with respect to the overall width wt of the lead tab 120 is 10%.

In the embodiment of the present invention, the first width w1 and the second width w2 at which the connection hole 125 may be spaced apart from both edges e1 and e2 of the lead tab 120, are designed to be 15.75 mm. Considering that the overall width wt of the lead tab 120 is 80 mm, a ratio of the first width w1 and the second width w2 at which the connection hole 125 may be spaced apart from both edges e1 and e2 of the lead tab 120, with respect to the overall width wt of the lead tab 120 is 19.69%.

According to the experimental results shown in FIGS. 7A and 7B, temperature of the lead tab 120 was measured according to a variation in discharge capacity while a discharging operation was performed at different discharge speeds 1C and 2C. Since the amount of the discharge current that flows through the lead tab 120 may be increased according to an increase in discharge speed, the temperature of the lead tab 120 rises. In addition, the temperature of the lead tab 120 rises at the same discharge speed according to an increase in discharge capacity.

Comparing temperature of the lead tab 120 at the time when the discharging operation was performed at the same discharge speed and with the same discharge capacity, the temperature according to the current embodiment of the present invention was lower than temperature according to the comparative example. For example, considering the time when the discharging operation was performed at the discharge speed of 2C and with a discharge capacity of 40000 mAh, in the comparative example, the temperature of the lead tab 120 was approximately 34.16° C.(FIG. 7A), and in the embodiment of the present invention, the temperature of the lead tab 120 was approximately 31.25° C. (FIG. 7B).

A degree of heat dissipation of the lead tab 120 varies as the position where the connection hole 125 may be formed varies, under the same discharge conditions based on the experimental results. Like in the embodiment of the present invention, the position where the connection hole 125 may be formed, may be adjusted so that a ratio of the first width w1 or the second width w2 at which the connection hole 125 may be spaced apart from both edges e1 and e2 of the lead tab 120, with respect to the overall width wt of the lead tab 120 is 12.5% or more. Thus, heat dissipation of the lead tab 120 may be reduced, and resistance of the charge/discharge path may be decreased, and overall charging/discharging efficiency may be improved.

Hereinafter, upper limit values of the first width w1 and the second width w2 in the range from the edges e1 and e2 of the lead tab 120 to the connection hole 125 will be described with reference to FIG. 6. If the first width w1 is greater than ⅓ of the overall width wt, the connection hole 125 may be formed slanted toward its central position so that the edges e1 and e2 of the lead tab 120 may come off. Likewise, if the second width w2 is greater than ⅓ of the overall width wt, the connection hole 125 may be folioed slanted toward its central position so that the edges e1 and e2 of the lead tab 120 may come off.

For example, if each of the first width w1 and the second width w2 is greater than ⅓ of the overall width wt, considering a diameter of the connection hole 125, the third width w3 of the connection hole 125 may be limited to be narrower than the first width w1 and the second width w2, and this means that the connection hole 125 may be formed relatively slanted toward its central position. Thus, each of the first width w1 and the second width w2 may be designed to be ⅓ of the overall width wt of the lead tab 120, i.e., to be 33.33% or less of the overall width wt.

Figure 8:
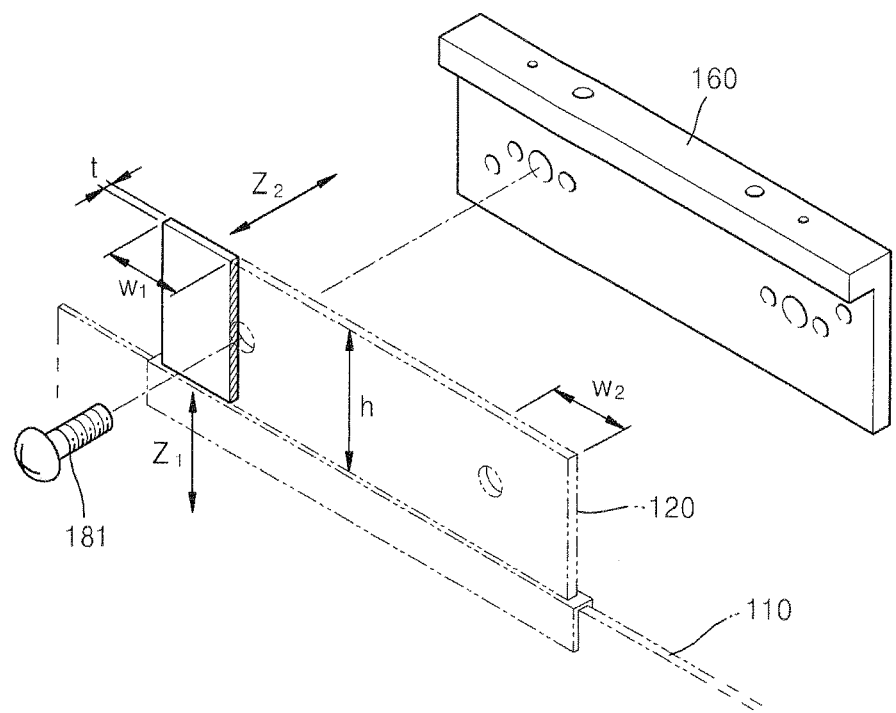
FIG. 8 is a perspective view of the lead tab illustrated in FIG. 1.

FIG. 8 is a perspective view of the lead tab 120 of FIG. 1. In the drawing, edges of the lead tab 120 are illustrated.

Referring to FIG. 8, the lead tab 120 may be closely adhered to the terminal it member 160 by using the connection member 181 that may be inserted in the connection hole 125 of the lead tab 120. Here, a current that passes through the edges of the lead tab 120 may include a current flow between the lead tab 120 and the battery cell 110 along a first direction $Z_1$, and a current flow between the lead tab 120 and the terminal member 160 along a second direction $Z_2$.

The current in the first direction $Z_1$ may flow through a cross-sectional area in which a first width w1 and a thickness t of the lead tab 120 are defined in regard to both sides. Based on the result of measuring a heat dissipation state of the lead tab 120 during a charging/discharging operation, the first width w1 may be designed to be 10 mm or more, and the thickness t of the lead tab 120 may be designed to be 0.3 mm or more. In this regard, the cross-sectional area in which the first width w1 and the thickness t of the lead tab 120 are defined in regard to both sides, may be 3 mm² or more. That is, the first width w1 and the thickness t of the lead tab 120 may satisfy the equation w1×t≥3 mm². For example, the first width w1 of the lead tab 120 may be designed to satisfy the equation w1≥3/t.

The current in the second direction $Z_2$ may flow through a cross-sectional area in which the first width w1 and a height h of the lead tab 120 are defined in regard to both sides. Based on the result of measuring a heat dissipation state of the lead tab 120 during a charging/discharging operation, the first width w1 may be designed to be 10 mm or more, and the height h of the lead tab 120 may be designed to be 31 mm or more. In this regard, the cross-sectional area in which the first width w1 and the height h of the lead tab 120 are defined in regard to both sides, may be 310 mm² or more. That is, the height h of the first width w1 and the lead tab 120 may satisfy the equation w1×h≥310 mm². For example, the first width w1 of the lead tab 120 may be designed to satisfy the equation w1≥310/h.

As described above, technical matters that have been described with respect to the first width w1 of the lead tab 120 with reference to FIG. 8 may be applied to the second width w2 of the lead tab 120. That is, the second width w2 and the thickness t of the lead tab 120 may satisfy the equation w2×t≥3 mm². In addition, the second width w2 and the height h of the lead tab 120 may satisfy the equation w2×h≥310 mm².

According to the present invention, when a lead tab is designed to induce a current generated from a battery cell to the outside, a position where a connection hole formed in the lead tab is optimized so that a secondary battery that may reduce electrical resistance of the lead tab on which a charge-discharge current is collected, may prevent heat concentration of the lead tab and improve charging/discharging efficiency.

It will be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A secondary battery comprising;
a battery unit having a rectangular prism shape with two surfaces on opposite sides to one another and four sides each connected to the two surfaces with either one of the two surfaces being wider than any of the four sides of the battery unit, comprising a battery cell and a lead tab that protrudes from the battery cell;
a frame case portion having, a flat plate shaped main body for supporting one of the two surfaces of the battery unit, said main body being wider and longer than said one of the two surfaces of the battery unit, comprising a first support portion extending on opposite sides of the main body at approximately 90 degrees for supporting the battery cell and a second support portion extending longitudinally from and directly connecter to the first support portion on the opposite sides of the main body for supporting the lead tab, said first support portion having a length approximately equal to a length of the main body; and
a connection member for perforating a connection hole formed in the lead tab and extending in a direction of the second support portion;
a terminal member having a generally rectangular prism shape with four sides and two surfaces in which one side of the lead tab is in direct physical contact with one of said two surfaces of the terminal member, said terminal member is interposed between the lead tab and the second support portion and is fixed on the second support portion, and said terminal member has a width greater than a width of the lead tab and a length equal to a length of the lead tab;
a holder case having a generally rectangular prism shape with four sides and two surfaces in which a side of the lead tab opposite to that where the terminal member is disposed is in direct physical contact with the case holder, and said holder case has a width and length greater than a width and length of the lead tab,
wherein the connection hole of the lead tab comprises:
first connection hole that is spaced apart from a first edge of the lead tab by a first width, said first width w1 and a thickness t of the lead tab satisfies the equation w1×t≥3 mm² and said first width w1 and a height h of the lead tab satisfies the equation w1×h≥310 mm²; and
a second connection hole that is spaced apart from a second edge of the lead tab by a second width, said second width with respect to the overall width of the lead tab is in a ratio of 1:8 or less.

2. The secondary battery of claim 1, wherein a ratio of the first width with respect to an overall width of the lead tab is designed to be 12.5% or more.

3. The secondary battery of claim 2, wherein a ratio of the second width with respect to an overall width of the lead tab is designed to be 12.5% or more.

4. The secondary battery of claim 1, wherein a fixing protrusion and a fixing hole that are used in combining the second support portion and the terminal member are formed in the second support portion and the terminal member, respectively.

5. The secondary battery of claim 1, wherein the lead tab and the terminal member overlay each other, and the connection member is used in combining the lead tab and the terminal member.

6. The secondary battery of claim 1, wherein the connection member perforates the holder case and the lead tab continuously and is connected to the terminal member.

7. A secondary batter comprising:
a battery unit having a rectangular prism shape with two surfaces on opposite sides to one another and tour sides each connected to the two surfaces with either one of the two surfaces being wider than any of the four sides of the battery unit, comprising a battery cell and a lead tab that protrudes from the battery cell;
a frame case portion having a flat plate shaped main body for supporting one of the two surfaces of the battery unit, said main body being wider and longer than said one of the two surfaces of the battery unit comprising a first support portion extending on opposite sides of the main body at: approximately 90 degrees for supporting the battery cell and a second support portion extending longitudinally from and directly connected to the first support portion on the opposite sides of the main body for supporting the lead tab, said first support portion having a length approximately equal to a length of the main body;
a terminal member having an L shape in which one side and one edge of the lead tab are in direct physical contact with the terminal member, said terminal member is interposed between the lead tab and the second support portion and is fixed on the second support portion, and said terminal member has a width greater than a width and length of the lead tab and a length equal to a length of the lead tab;
a holder case having a generally rectangular prism shape with four sides and two surfaces in which a side of the lead tab opposite to that where the terminal member is disposed is in direct physical contact with the case holder, and said holder case has a width and length greater than a width and length of the lead tab; and
a connection member that perforates a connection hole formed in the lead tab and is connected to the terminal member and the holder case,
wherein said connection hole in the lead tab does not come in contact with any edge of the lead tab.

8. The secondary battery of claim 7, wherein the connection hole of the lead tab comprises:
a first connection hole that is spaced apart from a first edge of the lead tab by a first width; and
a second connection hole that is spaced apart from a second edge of the lead to b a second width.

9. The secondary battery of claim 8, wherein a ratio of the first width with respect to an overall width of the lead tab is designed to be 12.5% or more.

10. The secondary battery of claim 9, wherein a ratio of the second width with respect to an overall width of the lead tab is designed to be 12.5% or more.

11. The secondary battery of claim 8, wherein a ratio of the first width with respect to an overall width of the lead tab and a ratio of the second width with respect to an overall width of the lead tab are designed to be 33.33% or less, respectively.

12. The secondary battery of claim 8, wherein a first width w1 and a thickness t of the lead tab satisfies the equation $w1 \times t \geq 3$ mm$^2$.

13. The secondary battery of claim 8, wherein the first width w1 and a height h of the lead tab satisfies the equation $w1 \times h \geq 310$ mm$^2$.

14. The secondary battery of claim 7, wherein a fixing protrusion and a fixing bole that are used in combining the second support portion and the terminal member are formed in the second support portion and the terminal member, respectively.

15. The secondary battery of claim 7, wherein another connection hole is formed through the second side of the terminal member electrically connecting a bus bar with an adjacent secondary battery.

* * * * *